Aug. 14, 1962   B. MEIER   3,049,030
DEVICE FOR SETTING A MACHINE TOOL
Filed Oct. 31, 1958   3 Sheets-Sheet 1

INVENTOR.
BRUNO MEIER
BY
ATTORNEY

Aug. 14, 1962 B. MEIER 3,049,030
DEVICE FOR SETTING A MACHINE TOOL
Filed Oct. 31, 1958 3 Sheets-Sheet 2

INVENTOR.
BRUNO MEIER
BY
K. A. Mayr
ATTORNEY

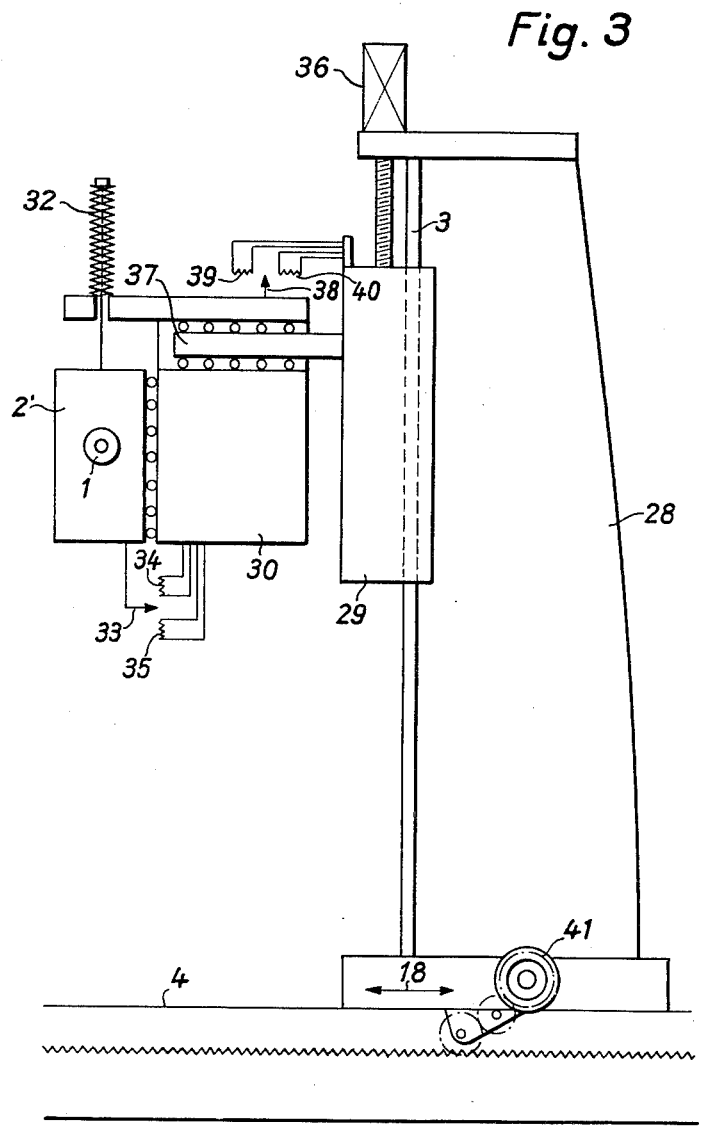

United States Patent Office 3,049,030
Patented Aug. 14, 1962

3,049,030
DEVICE FOR SETTING A MACHINE TOOL
Bruno Meier, Winterthur-Toss, Switzerland, assignor to Sulzer Freres, S.A., Winterthur, Switzerland, a corporation of Switzerland
Filed Oct. 31, 1958, Ser. No. 771,099
Claims priority, application Switzerland Nov. 2, 1957
4 Claims. (Cl. 77—5)

The present invention relates to a device for setting a machine tool, more particularly a drilling machine whose spindle is movable on a guide transversely, in most cases at a right angle, to its longitudinal axis so that it can be placed and set in the desired position which is preferably defined by a templet.

The device according to the invention includes a first slide which is movable along a guide by means of a motor and a second slide which supports the machine tool, for example, the drilling spindle, the second slide being movable in a direction parallel to the first slide whereby the extent of movability of the second slide relatively to the first slide is smaller than the extent of movability of the first slide.

Control means are provided which actuate the motor for moving the first slide according to the movement of the second slide relative to the first slide. An electric motor may be used for moving the first slide and in this case the control means preferably include at least one potentiometer which controls the operation of the electric motor proportionally to the extent of movement of the second slide relative to the extent of movement of the first slide. The control means may include two potentiometers one of which is used for controlling the electric motor to move the first slide in one direction and the other is used for controlling the electric motor for moving the first slide in the opposite direction.

A hydraulic motor may be used for moving the first slide and the control means for the hydraulic motor may include at least one element which controls the admission of a liquid working fluid to the hydraulic motor proportionally to the movement of the second slide relative to that of the first slide. The hydraulic motor preferably is provided with a cylinder and a piston reciprocable therein, the means for controlling the admission and discharge of the operating liquid preferably including a casing and a slide valve placed therein, the casing being connected with the first slide and the slide valve being connected with the second slide or vice versa.

A drilling machine having a horizontal spindle is preferably so designed that the spindle can be moved vertically as well as horizontally of its longitudinal axis whereby a first and a second slide is provided for each direction of movement, the second slide supporting the spindle and its operating means.

The novel features which are considered characteristic of the invention are set forth with particularity in the appended claims. The invention itself, however, and additional objects and advantages thereof will best be understood from the following description of embodiments thereof when read in connection with the accompanying drawing, in which:

FIG. 3 is a diagrammatic illustration of a drilling machine provided with a further modification of an apparatus according to the invention.

Like parts are designated by like numerals in the several figures.

Figure 1:
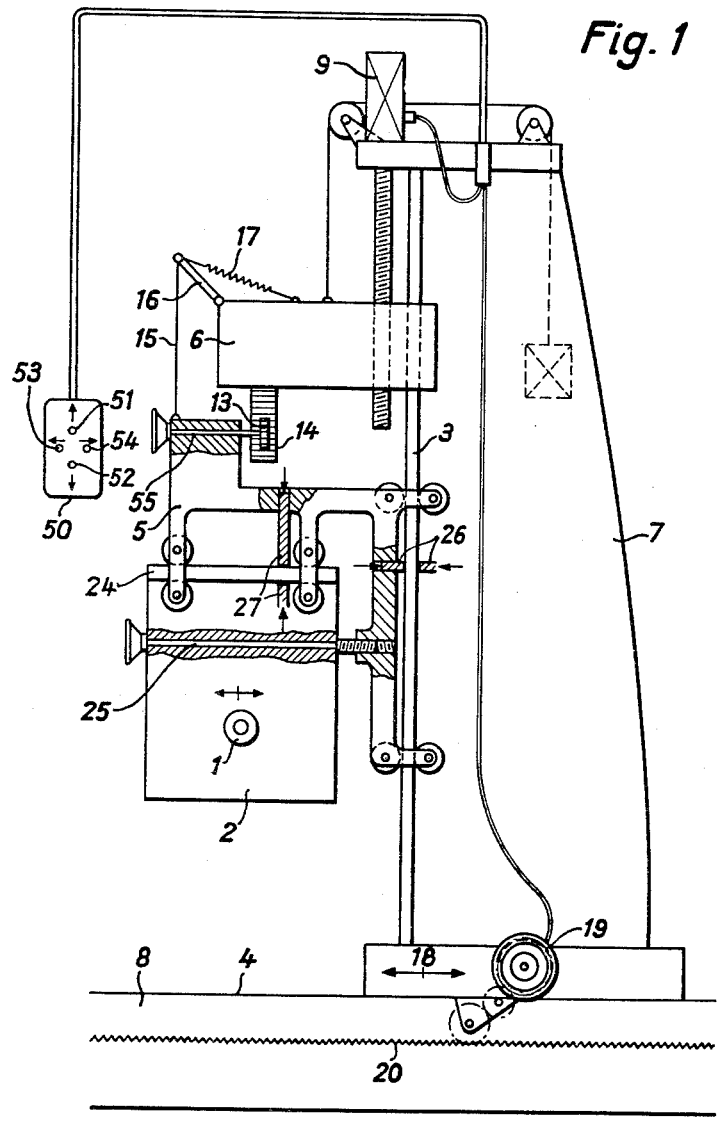
FIG. 1 is a diagrammatic illustration of a drilling machine equipped with an apparatus according to the invention.

Referring more particularly to the drawing, numeral 1 designates a work spindle which is movable in axial direction, which is normal to the plane of the drawing, in a drilling unit 2. The driving motor and the gears and bearings for the spindle forming part of the drilling unit are not illustrated because they do not form part of the present invention. The unit 2 is movable transversely to the longitudinal axis of the spindle 1 and parallel to guides 3 and 4 so that the spindle 1 can be placed in any desired elevation and lateral position. The coordinates of the individual positions of the spindle may be defined by templets attached to the work piece. The spindle is moved vertically and horizontally until the axis of the spindle coincides with the axis of the bore in the templet whereupon the drilling unit is fixed in the desired position, for example, by means of clamps. The drilling machine is now ready for driving the drilling tool, which is attached to the spindle, in the axial direction of the spindle into the work piece.

In the drilling machine shown in FIG. 1, the drilling unit 2 is supported by means of slides 5, 6 and 7 on a base or machine bed 8. For vertically moving the drilling unit the element 6 constitutes a first slide or support which is guided on a vertical guide 3 forming part of the slide or column 7. The element 5 which is also guided for vertical movement by the guide 3 forms with the element 2 a second support, supporting the drilling tool 1. The first slide or support 6 can be moved along the guide 3 by means of an electric motor 9. The weight of the slide 5 and of the drilling unit 2 is supported by the first slide 6 from which it is suspended by an element 15 connected to the free end of a lever 16 which swings on the slide 6, a spring 17 being connected with the free end of the lever 16 and with the slide 6 for counteracting the pull on the element 15. The spring 17 and the lever 16 are so arranged that the slide 5 with the drilling unit 2 can be displaced out of their equilibrium position to a small extent in upward or downward direction and relatively to the first slide 6 by rotating a pinion 13 at the end of a rod 55 which is rotatably supported on the slide 5, the pinion engaging a rack 14 extending vertically from the slide 6. For the horizontal movement of the drilling unit in the direction of the arrows 18 a motor 19 is provided which is mounted on the slide or column 7 and drives a set of gears, the last one engaging a rack 20 mounted on the base 8. The drilling unit 2 is supported by the element 5 by means of a guide rail 24 which forms part of the casing of the drilling unit and rests on rollers supported by the element 5. The unit 2 can be moved horizontally relatively to the elements 5 and 7 by rotation of a horizontal shaft 25 whose end is threaded and inserted in a threaded bore in the element 5.

The electric motors 9 and 19 are controlled by a switch unit 50. The motor 9 is so rotated that the slide 6 is moved upward upon pressing the push-button 51 of the switch unit 50. The motor 9 is rotated in the reverse direction, lowering the slide 6, upon depression of a push-button 52. Push-buttons 53 and 54 actuate the motor 19 in forward and reverse direction for moving the slide 7 on the base 8 in the directions of the arrows 18. By manipulation of the respective push-buttons 51 to 54 the drilling unit 2 is moved approximately into the desired position. By manipulation of the rods 25 and 55 the spindle 1 is moved horizontally and vertically until it is in the desired position whereupon the slides 5 and 2 are rendered immovable by tightening clamps 26 and 27.

Figure 2:
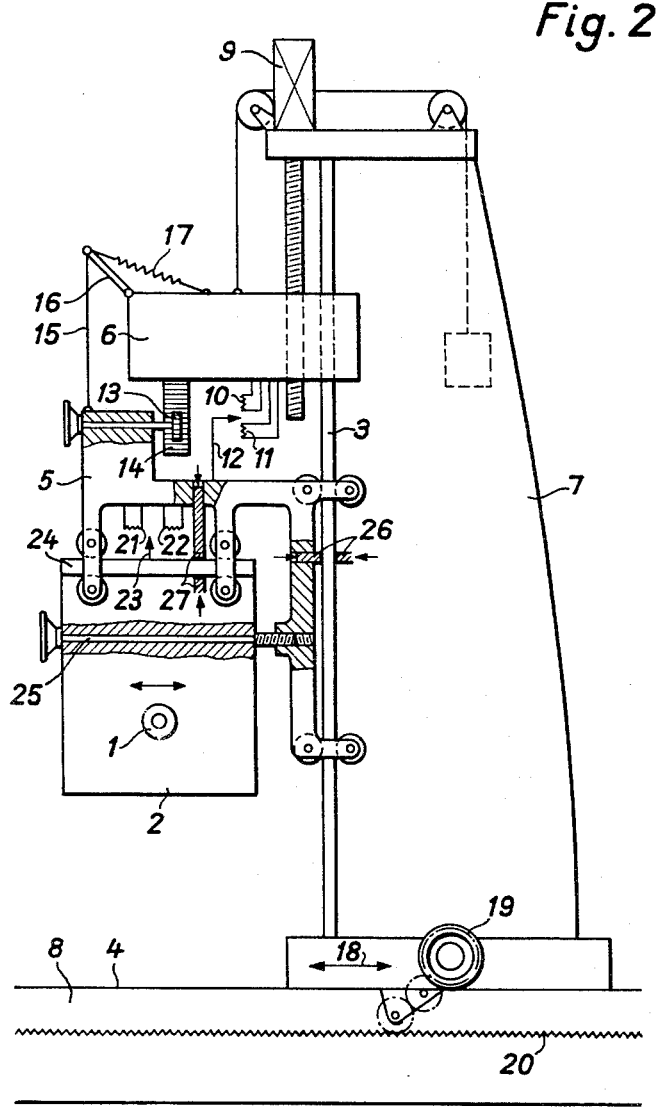
FIG. 2 is a diagrammatic illustration of a drilling machine equipped with a modified apparatus according to the invention.

The drilling machine illustrated in FIG. 2 is of the same type as the drilling machine illustrated in FIG. 1. Additional control means are interposed between the pairs of slides which move the spindle 1 in horizontal and vertical direction. The control means automatically operate the motor for moving the respective first slide or support in response to the movement of the respective second slide or support relative to the respective first slide. The electric motor 9 for effecting vertical movement of the spindle unit 2 is controlled by a pair of potentiometers 10 and 11, the potentiometer 10 causing rotation of the motor 9 to lift the drilling unit and the potentiometer 11 causing rotation of the motor 9 to lower the drilling unit. The potentiometers 10 and 11 are mounted on the first slide 6, a contact element 12 for contacting the potentiometers 10 and 11 being mounted on the slide 5. Upon vertical movement of the slide relative to the first slide the contact 12 makes contact with one of the two potentiometers which causes operation of the motor 9 so that the first slide 6 follows the movement of the slide 5 until the contact 12 is again in zero position between the two potentiometers. In this way even a very heavy drilling unit can be moved upward and downward with very little manual effort. When the spindle is centered according to the invention by means of a templet and by means of the setting device neither the templet nor the drilling tool will be damaged.

The motor 19 for the horizontal displacement of the support including the element 2 for supporting the drilling spindle 1 is controlled by two potentiometers 21 and 22 which are mounted on the slide 5 and a cooperating contact 23 which is mounted on the element 2. The horizontal movement of the element 2 relative to the slide 5 causes engagement of the contact 23 with one of the two potentiometers 21 and 22. This causes operation of the motor 19 in the desired direction. The column 7 supporting the first support means 6 follows the element 2. When the spindle 1 is properly located by the described vertical and horizontal movements, the position of the unit 2 can be fixed by applying the clamps 26 and 27.

The drilling machine shown in FIG. 3 is fundamentally the same as the drilling machine shown in FIGS. 1 and 2. However, the slides are arranged differently.

A frame or column 28 vertically slidably supports a first support means 29 which horizontally slidably supports a slide element 30, the latter supporting a drilling unit 2' by a spring 32 which is mounted on the slide 30 so that the drilling unit can be manually vertically moved relative to the slide 30 out of the equilibrium position, by very little force until a contact 33 mounted on the unit 2' engages one of two potentiometers 34 or 35 which are mounted on the element 30. Suitable conventional wiring connections, not shown, between the potentiometers 34 and 35 and the motor 36 and connected to the contact 33 cause the motor 36, upon contact of one of the potentiometers with the contact 33, to rotate in a direction effecting movement of the slides 29 and 30 to follow the initial movement of the unit 2' until the slide element 30 has reached the elevation of the unit 2' and the contact 33 is in neutral position between the two potentiometers 34 and 35.

For moving the unit 2' in horizontal direction to the right or to the left the element 30 is moved along a horizontal guide 37 extending from the element 29 whereby a contact 38 engages either a potentiometer 39 or a potentiometer 40 depending on the direction of horizontal movement of the unit 2'. Movement to the right of the unit 2' and of the slide 30 and engagement of the contact 38 with the potentiometer 40 causes rotation of the motor 41 to move the elements 28 and 29 to the right until the contact 38 is again in neutral position between the two potentiometers 39 and 40. Movement of the unit 2' to the left causes engagement of the contact 38 with the potentiometer 39 and rotation of the motor 41 to move the elements 28 and 29 to the left until the contact 38 is once more in the neutral position. Wiring connections of the contact 38 and of the potentiometers 39 and 40 with the motor 36 are not illustrated because they are conventional.

Instead of the potentiometers suitable conventional electronic devices may be used for controlling the operation of the electric motors.

Instead of electric motors for moving the slides hydraulic or pneumatic motors may be used without departing from the scope of the invention. In this case a slide valve having two parts, one being connected with one slide and the other being connected with another slide, would be used in lieu of a potentiometer.

The horizontal movement of the drilling unit 2 need not be normal to the longitudinal axis of the drilling spindle; the horizontal movement may be directed at an angle other than 90° to the axis of the work spindle.

Conventional hydraulic means, not shown, may be used for interconnecting the slides 5 and 6 in FIGS. 1 and 2 and 30 and 2' in FIG. 3 instead of the springs shown in the drawing.

I claim:

1. A machine tool comprising a tool spindle, a machine bed, a column horizontally movably mounted on said machine bed, first support means, means for vertically movably supporting said first support means by said column, a first motor operatively connected to said column and to said first support means for vertically moving said first support means relatively to said column, second support means supporting said tool spindle, means for vertically movably supporting said second support means by said first support means, manually operable means connected to said first and to said second support means for vertically moving said second support means relatively to said first support means, said second support means including manually operable means affording horizontal movement of said second support means relative to said first support means, drive means connected to said machine bed and to said column for horizontally moving said column on said machine bed, a second motor connected to said drive means for driving the latter, and automatic control means operatively connected to said second support means and being responsive to the horizontal relative movements of said first and second support means effected by the respective manually operable means, said control means being operatively connected to said second motor for driving said drive means to horizontally move said column on said machine bed according to the horizontal relative movements of said first and said second support means.

2. A machine tool as defined in claim 1 including second automatic control means operatively connected to said second support means and being responsive to the vertical relative movements of said second support means and said first support means effected by the respective manually operable means, said second automatic control means being operatively connected to said first motor for actuating said first motor to vertically move said first support means relative to said column in accordance with the vertical relative movements of said first and said second support means.

3. A machine tool comprising a tool spindle, a machine bed, a column, said machine bed and said column including cooperating means affording horizontal movement of said column on said machine bed, first support means, means for vertically movably supporting said first support means by said column, second support means, means for vertically movably supporting said second support means by said first support means, said second support means supporting said tool spindle, a motor operatively connected to said column and to said first support means for vertically moving said first support means on said column, manually operable means operatively connected to said first support means and to said second support means for vertically moving said second support means relative to said first support means, and automatic control means operatively connected to said first and to said second support means and being responsive to the vertical relative movements of said first and second support means effected by said manually operable means, said control means being connected to said motor for actuating said motor to vertically move said first support means relative to said column in accordance with the vertical relative movements of said first and said second support means.

4. A machine tool comprising a base member, a column horizontally movably connected to said base member, a first support means vertically movably connected to said column, a second support means horizontally movably supported by said first support means and including manually operable means affording horizontal movement of said second support means relative to said first support means, a work spindle connected to said second support means, a drive means connected to said base member and to said column for horizontally moving said column on said base member, a motor connected to said drive means for driving the latter, and automatic control means including means responsive to the direction and extent of the relative horizontal movements of said support means and connected to said motor for actuating said motor to drive said drive means to horizontally move said column on said base member in the same direction as and to an extent proportional to the extent of the horizontal relative movement of said support means.

References Cited in the file of this patent
UNITED STATES PATENTS

| | | |
|---|---|---|
| 1,676,206 | Ratliff | July 3, 1928 |
| 2,333,589 | Schauer | Nov. 2, 1943 |
| 2,387,820 | Armitage et al. | Oct. 30, 1945 |
| 2,823,590 | Swanson et al. | Feb. 18, 1958 |
| 2,868,086 | Gunderson | Jan. 13, 1959 |